Feb. 24, 1948. H. W. HANNERS 2,436,429
FUEL INJECTION NOZZLE TESTING DEVICE FOR DIESEL ENGINES
Filed Aug. 27, 1945 3 Sheets-Sheet 1

INVENTOR.
Harvey W. Hanners
BY
C. Verne Martin
ATTORNEY

Feb. 24, 1948.   H. W. HANNERS   2,436,429
FUEL INJECTION NOZZLE TESTING DEVICE FOR DIESEL ENGINES
Filed Aug. 27, 1945   3 Sheets-Sheet 2

INVENTOR.
Harvey W. Hanners
BY
C. Verne Martin
ATTORNEY

Feb. 24, 1948. H. W. HANNERS 2,436,429
FUEL INJECTION NOZZLE TESTING DEVICE FOR DIESEL ENGINES
Filed Aug. 27, 1945 3 Sheets-Sheet 3

INVENTOR.
Harvey W. Hanners
BY
C. Verne Martin
ATTORNEY

Patented Feb. 24, 1948

2,436,429

UNITED STATES PATENT OFFICE 2,436,429

FUEL INJECTION NOZZLE TESTING DEVICE FOR DIESEL ENGINES

Harvey W. Hanners, Springfield, Ohio, assignor to The National Supply Company, Pittsburgh, Pa., a corporation of Pennsylvania Application August 27, 1945, Serial No. 612,908

11 Claims. (Cl. 73—119)

This invention relates to a device for testing and checking the spray penetration or impinging force of the spray discharged from fuel injection nozzles prior to their assembly in a Diesel engine.

Nozzles for fuel injection in Diesel engines must be thoroughly checked and tested prior to their assembly in the Diesel engine, otherwise considerable time and labor is wasted should it develop that the nozzle is defective after assembly.

A rather primitive method has been in general use in many instances. This consisted of checking the relative penetration of nozzle sprays by the feel of the spray impinging against the finger of the operator making the test. Obviously this method is not only inaccurate but also dangerous to the operator as a case of blood poisoning could easily result from such practice.

The use of a swinging pendulum or target to judge the penetrating force of a spray has also been used in the past in the study of fuel sprays. The word "pendulum" or "target" is defined as that part of the device arranged so as to swing in an arcuate path about its pivot or to deflect from an initial position under the force of the fuel spray and in which the counteracting or restoring force may be that of gravity, springs or other means. Some of the difficulties encountered and overcome in the present invention in the use of the pendulum type nozzle testing devices will be enumerated.

The main difficulty lies in the fact that the average force with respect to time acting on the pendulum is very small. The injection occurs during about 20° of the camshaft rotation, hence during the remaining 340° there is no force acting upon the pendulum. The use of the very light pendulum necessary for sufficient deflection was found to be very unstable and fluttered about without regard to any uniformity. Stability combined with sensitiveness had to be incorporated in solving the problem. Counterweights for the pendulums and a damping tank or trough are provided to further stabilize the pendulums without sacrificing their sensitiveness. The point of suspension is also a pertinent factor.

The original intention was to provide a device to measure the penetrative force of the dense center of the spray called the "core," as apart from the finely atomized part of the spray called the "envelope" which surrounds the "core." It was assumed that this envelope would have a negligible effect on the deflection of a pendulum or target used to measure the penetrating force of the core. Tests were made with nozzles having certain desired characteristics and of the same general design. It was found that a single pendulum was a reliable guide only with a very limited class of nozzles and that other nozzles might give the same pendulum deflections but very poor results in the engine. A single pendulum will measure the maximum force of all the fuel impinging upon it and not merely that of the "core." It is, therefore, necessary to provide a nozzle testing device that can be used to test nozzles for a certain engine to the same standards regardless of the nozzle design.

To overcome the difficulty cited above I have incorporated in my device a dual or plural pendulum system wherein the penetrative force of all of the spray is considered through a plurality of pendulums as well as the maximum penetration. To accomplish this important result I provide a hole in the pendulum nearest the nozzle to allow the "core" to pass through and impinge upon the second or "core" pendulum while the first pendulum stops the "envelope" of the spray. The first or "envelope" pendulum is then deflected by an amount which is a measure of the penetrative force of the "envelope" of the spray and the second or "core" pendulum is deflected by an amount which is a measure of the penetrative force of the "core" of the spray. It will be apparent that my dual system provides means to segregate the envelope and core spray penetration and is not limited to the measurement of the total penetrative force alone.

The distances of the pendulums from the nozzle were determined to some extent by the appearance of the fuel sprays when viewed by stroboscopic light at the end of the injection period. The pendulum for measuring the "core" penetrating force is positioned near the distance at which the spray shows the maximum length of the sharp outline of the central part or "core." The "envelope" pendulum (with the hole in it) is positioned at a distance from the nozzle at which the sprays attain approximately the greatest clearly defined diameter or "envelope" surrounding the "core." In the present instance this was determined to be about half way between the "core" pendulum and the nozzle tip.

A more complicated variation of the present arrangement would be to use three or more pendulums. In this case all but the last or "core" pendulum would be provided with a hole therein for the "core" spray to pass through.

Another variation is to use a stationary screen for the first or envelope pendulum. A hole for the core spray should be placed in the proper position to allow the core spray to pass on through to the core pendulum. This construction has the disadvantage of some of the envelope spray passing through the screen with sufficient force to effect the reading of the penetration on the core pendulum. These alternates have been considered but not deemed to be satisfactory and are not shown in the present invention.

The principal object of my invention is, therefore, to provide a device for testing the spray penetration of Diesel engine fuel nozzles by the pendulum method.

Another object of my invention is to provide a nozzle spray testing device using a plurality of pendulums or targets to better determine the nature of the spray and the envelope and core characteristics of the spray passing through the nozzle.

Another object of my invention is to provide a nozzle testing device using counterbalanced pendulums and a damping tank through which the pendulums drag to stabilize the pendulums in their movement.

Another object of my invention is to produce a fuel spray nozzle testing device in which a plurality of fuel spray targets are suspended near their respective centers of gravity to provide a considerable moment of inertia to obtain a substantially steady deflected position of said targets as they are impinged by a pulsating or periodic spray.

Another object of my invention is to produce a fuel spray nozzle testing device in which the suspended targets dip into a fluid damping tank to give substantially steady deflected positions to said targets as they are impinged by a pulsating or periodic spray.

Another object of my invention is to provide an indicating means in conjunction with my testing device whereby the effect of both the envelope spray and the core spray may be registered.

Another object of my invention is to provide a nozzle testing device wherein it is possible to test nozzles for given engine specifications to the same standard regardless of the nozzle design.

Another object of my invention is to provide a nozzle testing device that will indicate and register the penetration and intensity of the "envelope" and "core" fuel spray separately.

Another object of my invention is to provide a nozzle spray testing device that will measure not only the maximum force of all the fuel impinging upon the device but will also segregate and indicate the portion impinging upon the "envelope" and "core" separately.

Other objects and advantages of my invention will become apparent during the course of the following description and appended claims in connection with the accompanying drawings illustrating the preferred constructional embodiments of my invention wherein like parts are designated by like numerals.

Figure 4 is a cross-section taken on the line 4—4 of Fig. 1 through one of the pendulums showing the channel construction employed.

Figure 1:
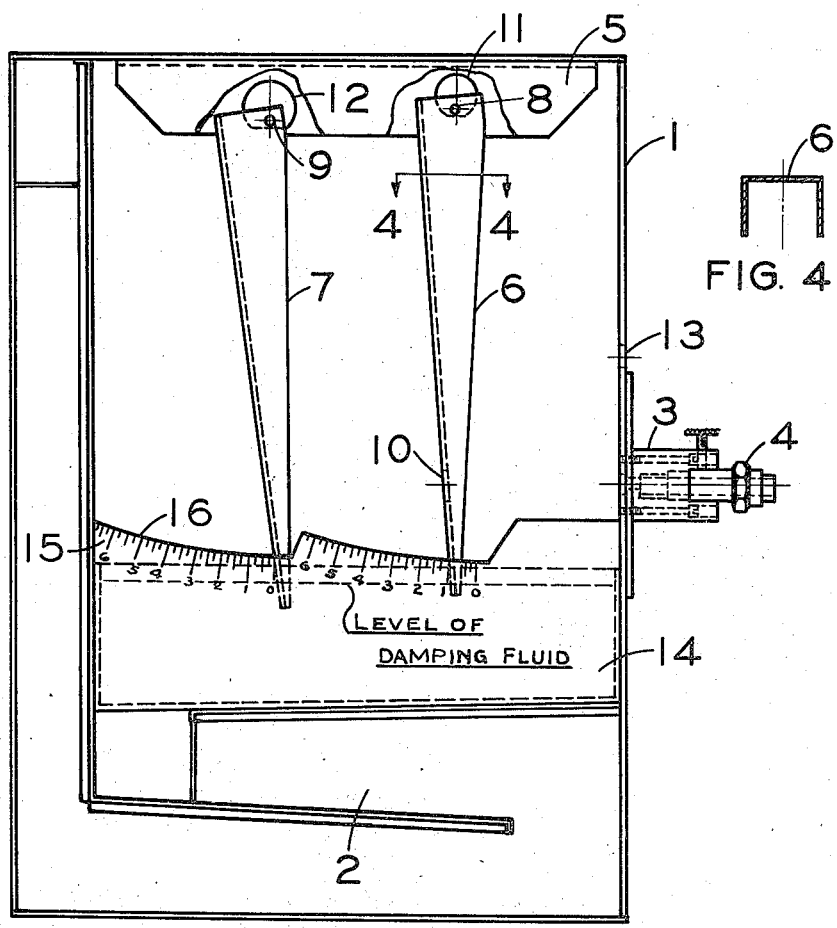
Figure 1 is a front elevational view of an assembly of my nozzle testing device with the front cover removed and parts broken away to show the operating mechanism and the pendulum suspension arrangement.
Figure 3:
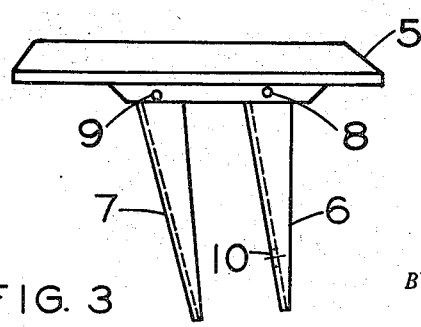
Figure 3 shows a perspective view, to a reduced scale, of a subassembly of the dual pendulum mounting disclosed in the preferred construction of my invention.

In the drawings, for illustration purposes only, the pendulum or target assembly and its operating mechanism is shown to be mounted in a rectangular shaped box or housing 1, fitted with a filter 2, attached to a suction fan (not shown) to remove oil vapors. This confines the spray and prevents it from contaminating the air in the room.

The nozzle holder 3 is machined to very close limits and accurately attached to the side of the housing 1, at right angles to its longitudinal axis, and adapted to snugly receive a nozzle 4 therein to be tested. The nozzle is positioned in the holder in such manner that the main core of the spray will always be directed in a plane parallel to the longitudinal axis of the housing to obtain consistent results.

A suitable U-shaped frame 5 is mounted within the top portion of the housing 1 and extends longitudinally of the center thereof. An "envelope" pendulum 6 and a "core" pendulum 7 are pivotally mounted in spaced relation as at 8 and 9 respectively within the frame 5 and are adapted to swing in an arcuate path about said pivots in the plane of the nozzle spray. The point of the pendulum suspension was so chosen that at the middle of the pendulum travel the surface of the pendulum target was at approximately 90° to the direction of the spray. This gives a better linearity of spray force versus deflection.

The envelope pendulum 6 is provided with a hole 10 through the face of the pendulum or target at right angles to the direction of spray from the nozzle 4. It is large enough to permit the core spray to pass through without obstruction and the center of the hole is positioned slightly below the center of the spray when the envelope pendulum 6 is at rest. This construction insures that as the envelope pendulum is deflected in its arcuate path, the hole rises so that it will be substantially in registry with the spray for normal deflection of the envelope pendulum 6.

The pendulums are counterweighted as at 11 and 12 respectively at their upper ends above the pivots. This construction reduces the overall lengths of the pendulums and at the same time retains the advantages of a large moment of inertia for stability and suspension near the center of gravity for sensitivity. The pendulums or targets are channel shape, as shown at Figure 4. The edges of the channel are turned towards the nozzle 4 which prevents the fuel from splashing off the surface of the pendulum into the face of the observer. A sight hole 13 is provided in the end face of the housing 1 above the nozzle holder 3 to inspect the alignment of the pendulums.

In order to obtain further stability to the light weight pendulums 6 and 7 their lower ends are made long enough to dip into a damping tank 14 containing fuel oil. This tank is in the same plane with the nozzle spray and pendulums and is parallel to the U-shaped pendulum suspension frame member 5. It is positioned just above the filter 2 in the lower portion of the housing 1 and extends the full length of said housing. The supply of fuel oil in the tank is replenished by the spray itself and is maintained at a constant level by means of an overflow outlet and return pipe (not shown). The damping effect of the lower ends of the pendulums dragging through the bath of oil stabilizes the pendulums or targets and helps to maintain them in a substantially steady deflected position as they are impinged by a plurality of pulsating or periodic sprays.

The upper edge 15 of the tank, extending above the oil level, is arcuate in shape to correspond to the arcuate travel of the pendulums. It is graduated as at 16 after the pendulums are in place with numbers stamped thereon to indicate the lengths of arc of pendulum swing in inches. The counterweights 11 and 12 are then attached to the pendulums 6 and 7 respectively so that the free or static zero (0) position will not be disturbed.

An opening 30 (Fig. 5) is provided in the front face of the housing 1 to allow the operator to observe the swing of the pendulums or targets to determine the penetrating force of the spray as indicated by the position of the pendulum with respect to the graduated scales 16.

In operation:

A fuel nozzle 4 to be tested with respect to the relative penetrative force of the core and envelope of the spray is secured in the nozzle holder 3. Liquid fuel under pressure is introduced by any suitable means (not shown) through the nozzle to simulate the actual working conditions under which the nozzles operate. The fuel issues from the nozzle tip in a plurality of pulsating or periodic sprays characteristic of Diesel engine operation. The usual design of nozzle produces an envelope spray and a core spray passing through the center of the envelope spray. The envelope spray impinges against the exposed surface of the envelope pendulum or target 6 and causes the target to swing in an arcuate path about its fulcrum, deflecting it by an amount which is the measure of the penetrative force of the envelope spray. The core spray passes through the hole in the envelope pendulum and impinges against the solid exposed surface of the core pendulum or target 7. The core spray impingement causes the core target to swing about its fulcrum and is deflected by an amount which is a measure of the penetrative force of the core spray. The pendulums are stabilized and held substantially in a steady deflected position during the fuel injection test period by the counterweights 11 and 12 secured to the upper portion of the pendulums and the resistance offered to the tip ends of the pendulums being cushioned in the fuel oil in the damping tank 14. By noting the positions of the pendulums with respect to the graduated scale 16 on the side of the tank 14 it is very easy to determine the relative quality of the spray of each nozzle being tested.

This device has proven, in actual shop operations, to be a dependable guide in the selection of nozzles for engines and eliminates much time and labor in the production department assembling engines. The particular value of the device is that by its use it is possible to select nozzles which have certain desirable spray qualities or characteristics for certain engines. It is not claimed that my device will make possible the selection of nozzles without regard to other tests or characteristics, such as length of injection period or opening pressure of the nozzle. My device does, however, make it possible to select nozzles according to the general shape of the spray, particularly with respect to the penetration of the spray and the relative amount of fuel in the envelope and core of the spray. It gives a practical and useful answer to the important question of "how much fuel penetrates how far" in an empirical and arbitrary manner with respect to the desired fuel spray characteristics.

Figure 6:
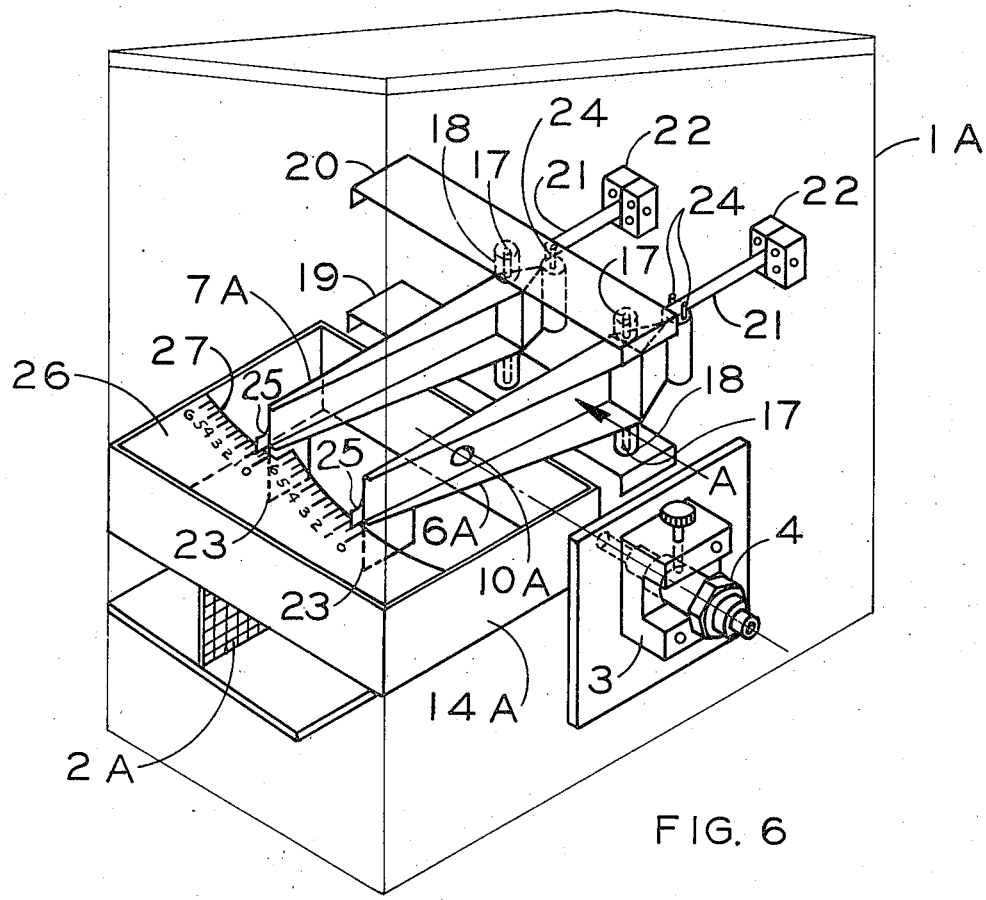
Figure 6 is a phantom perspective assembly view of an alternate construction embodying the principles of my invention wherein the targets deflect in a horizontal plane and are stabilized by the action of a leaf spring.

An alternate construction is disclosed in a phantom perspective assembly at Figure 6 showing a housing 1A, filter 2A, nozzle holder 3 and nozzle 4. An envelope target 6A and a core target 7A are pivotally supported on pintles 17, mounted in bearing 18, secured upon bearing plates 19 and 20 within the housing 1A.

The targets are adapted to swing or to be deflected in a plane coincident with the axis of the fuel spray. The deflections, due to the forces of the pulsating or periodic impingement of the fuel spray, are stabilized by double acting leaf springs 21, suitably anchored within the housing as at 22.

A pair of stops 24 is positioned on the outer end of each target, nearest the fulcrum pintles 17, to straddle the free end of the leaf springs 21. This arrangement acts to retard and stabilize the deflection of said targets and return them to their at rest or zero position when the impinging forces acting against them are relieved.

A paddle or fin 23 is formed with the outer end of the targets 6A and 7A and depends therefrom into the damping fluid in the tank 14A to further steady the targets. The faces of the targets subjected to the impinging forces of the fuel spray are substantially normal thereto and are of channel shaped construction as described in the preferred embodiment of my invention. The envelope target 6A is provided with a hole 10A substantially in the same plane with the axis of the spray from the injection nozzle 4.

Figures 2, 5:
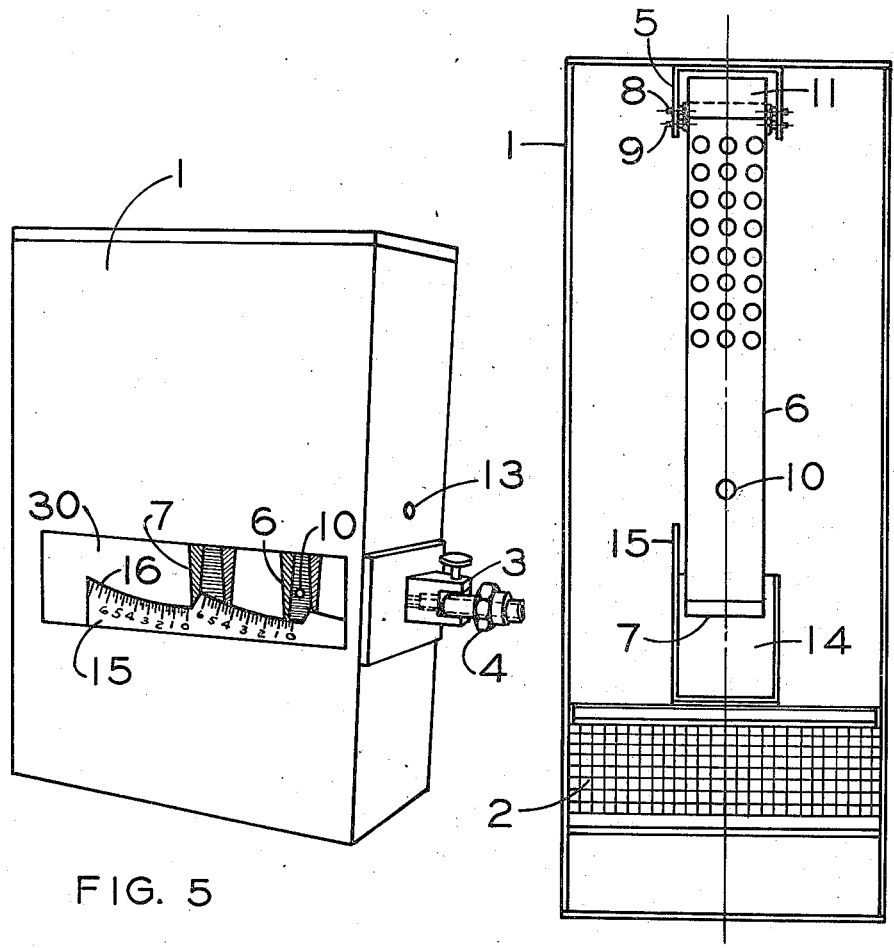
Figure 2 is an end elevational view of my nozzle testing device, with the end cover removed to show the operating mechanism.
Figure 5 is a perspective elevational view of the assembled device, drawn to a reduced scale, particularly showing the relationship between the nozzle and the targets.

An indicating pointer 25 is formed on the extreme outer end of the targets 6A and 7A and projects beyond the fins 23. A graduated scale dial 26 is secured upon the damping tank 14A and is provided with graduations 27 in alignment with the arcuate path of the pointers 25 to register the deflections of said targets 6A and 7A. For the sake of clarity the opening 30, as shown in Figure 5, is omitted in Figure 6.

Figure 7:
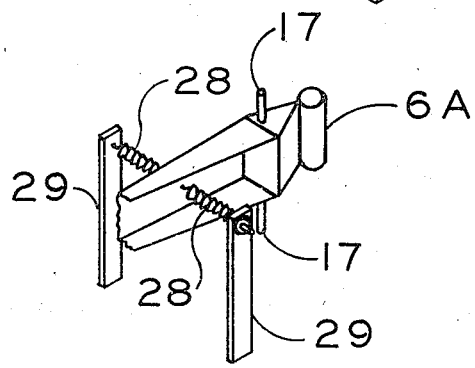
Figure 7 is a partial assembly taken in the direction of the arrow A of the target mounting of a further modification of the construction shown in Fig. 6. This view illustrates a pair of coil stabilizing springs to supplant the leaf spring shown in Fig. 6.

A further alternate construction is shown in Figure 7. This is an assembly view of a portion of the targets 6A and 7A (target 6A only being shown) pivotally supported as in Figure 6. In this construction the leaf spring 21 is replaced by a pair of coil springs 28 for each target, suitably mounted on supports 29 and adapted to arrest the deflections of targets 6A and 7A in either direction of their swinging travel and return them to their zero position when there is no exterior force acting upon them.

It is understood that the two assemblies described above could be mounted so that the nozzle to be tested could be positioned to discharge in a vertical plane and that the targets 6A and 7A would then be pivotally supported to deflect in a vertical plane coincident with the axis of the fuel spray. In this instance the faces of the targets subjected to the impinging forces of the fuel spray would likewise be substantially normal thereto as described above.

In actual practice in using my invention it has been found that nozzles which operate properly in an engine give the same readings in my pendulum nozzle tester, both before and after the engine test. Also should the engine performance be unsatisfactory it is a simple matter to determine which nozzles have failed due to a change in the spray pattern. Thus the pendulum nozzle tester is a reliable device for determining both the original nozzle spray pattern and for detecting any change in the spray pattern which might occur as a result of the use of the nozzle in the engine.

While only the preferred and two alternate forms of my invention have been disclosed and described herein, I do not wish to be limited or restricted to the specific details set forth and wish to reserve to myself any further embodiments, modifications and variations that may appear to those skilled in the art or come within the scope of the appended claims.

Having fully described my invention, what I claim as new and desire to secure by United States Letters Patent is:

1. A device for testing the impinging forces of plural spray portions discharged under pressure from a fuel injection nozzle, comprising a housing, a plurality of targets pivotally supported therein in spaced relation to said nozzle and to each other and adapted to deflect in a plane coincident with the axis of said spray, the target nearest the nozzle being provided with an opening for the passage of one of the spray portions, and means to obtain separate measurements of the deflections as measures of the impinging forces of the plural portions of said spray.

2. A device for testing the impinging forces of a spray composed of an envelope portion and a core portion discharged under pressure from a fuel injection nozzle comprising a housing, a plurality of targets pivotally supported therein in spaced relation to said nozzle and to each other and adapted to deflect in a plane coincident with the axis of said spray, the target nearest the nozzle being provided with an opening for the passage of the core portion of said spray, stabilizing means to maintain said targets in a deflected position when acted upon by said fuel discharge and means to obtain separate measurements of the deflections as measures of the impinging forces of the said envelope and core portions.

3. A device for testing the impinging forces of the pulsating plural spray portions discharged under pressure from a fuel injection nozzle, comprising a housing, a plurality of counterweighted pendulums pivotally supported therein in spaced relation to said nozzle and to each other and adapted to deflect in an arcuate path in a plane coincident with the axis of said spray portions, the pendulum nearest the nozzle being provided with an opening for the passage of one of the spray portions to obtain a substantially steady position of said pendulums as deflected by the pulsating spray and means to obtain separate measurements of the deflections as measures of the impinging forces of the plural portions of said spray.

4. A device for testing the impinging forces of the plural spray portions periodically discharged from a fuel injection nozzle comprising a housing, a plurality of counterweighted pendulums pivotally supported therein near their centers of gravity, in spaced relation to said nozzle and to each other and adapted for deflection in a plane coincident with the axis of said spray portions, a damping tank containing fluid into which the outer ends of said pendulums dip to maintain a substantially steady position of said pendulums as deflected by said periodic spray and a hole in the pendulum nearest the nozzle substantially in registry with said nozzle for the passage of one of the spray portions and means to obtain separate measurements of the deflections as measures of the impinging forces of the plural portions of said periodic spray.

5. A device for testing the impinging forces of plural spray portions discharged under pressure from a fuel injection nozzle comprising a housing, a plurality of targets pivotally supported therein in spaced relation to said nozzle and to each other and adapted for movement in an arcuate path in a plane coincident with the axis of said spray portions, each target being provided with counterweights secured to their outer ends near their supports, the target nearest the nozzle being provided with an opening for the passage of one of the spray portions, and means to obtain separate measurements of the deflections as measures of the impinging forces of the plural portions of said spray.

6. A device for testing the impinging forces of plural spray portions discharged under pressure from a fuel injection nozzle comprising a housing, a plurality of pendulums pivotally supported therein in spaced relation to said nozzle and to each other and adapted to be deflected by the impinging forces discharged through said nozzle, each pendulum being provided with counterweights secured to their outer ends near their supports, the pendulum nearest the nozzle being provided with an opening for the passage of one of the spray portions, damping means to stabilize said pendulums and maintain them in a substantially steady deflected position when acted upon by said fuel discharge and means to obtain separate measurements of the deflections as measures of the impinging forces of said plural portions of said spray.

7. A device for testing the penetration of the plural spray portions of fuel nozzles by forcefully discharging fuel therethrough comprising a housing, a plurality of pendulums pivotally supported in said housing in spaced relation to said nozzle and to each other and adapted to be deflected in an arcuate path about said pivots by the fuel forcefully discharged through said nozzle, the pendulum nearest the nozzle being provided with an opening therethrough in substantial alignment with the fuel opening in said nozzle to pass one of the spray portions, a pendulum damping tank positioned within said housing containing a damping fluid through which the outer end of said pendulums are adapted to drag, and graduated scales upon one face of said tank to separately indicate the measurements of the deflections as measures of the penetrative forces of said spray portions.

8. A device for testing the relative penetrative force of the spray composed of envelope and core portions being periodically ejected from a fuel injection nozzle comprising a housing, a counterweighted pendulum for the envelope portion having an opening substantially in alignment with said nozzle to allow the core spray portion to pass therethrough, and a counterweighted pendulum for the core portion, each pendulum being pivotally supported within said housing near their centers of gravity in spaced relation to said nozzle and to each other and adapted for deflection in an arcuate path by the penetrative force of the spray ejected from said nozzle, a fluid damping tank into which the outer ends of said pendulums dip to stabilize and maintain said pendulums in a substantially steady deflected position when acted upon by said periodic spray and a graduated scale on the face of said damping tank to separately indicate the deflections as measures of the relative penetrative force of said envelope and core spray portions.

9. A device for testing the impinging forces of plural spray portions discharged under pressure from a fuel injection nozzle comprising a housing, a plurality of targets pivotally supported within said housing in spaced relation to said nozzle and to each other, each having an impinging face substantially normal to and adapted to be deflected arcuately by the impinging forces discharged through said nozzle, the target nearest the nozzle being provided with an opening for the passage of one of the spray portions, a graduated scale in close proximity to the outer ends of said targets to obtain separate measurements of the deflections as measures of the impinging forces of the plural portions of said spray.

10. A device for testing the impinging forces of pulsating plural spray portions discharged under pressure from a fuel injection nozzle comprising a housing, a plurality of spaced pendulums pivotally supported within said housing and in spaced relation to said nozzle and adapted for deflection in an arcuate path in a plane coincident with the axis of said spray portions, the pendulum nearest the nozzle being provided with an opening for the passage of one of the pulsating spray portions, stabilizing means to maintain said pendulums in a substantially steady deflected position when acted upon by said fuel discharge and a graduated scale in close proximity to the outer ends of said pendulums to obtain separate measurements of the deflections as measures of the impinging forces of the plural portions of said spray.

11. A nozzle testing device for determining the relative penetration of the impinging forces of the envelope and core spray portions of a Diesel engine fuel being forcefully discharged through a fuel injection nozzle, comprising a housing, an envelope pendulum for the envelope portion having an orifice substantially in alignment with said nozzle to allow the core spray portion to pass therethrough, a core pendulum for the core portion, each pendulum being pivotally supported in said housing in spaced relation to said nozzle and to each other and adapted to be deflected in an arcuate path about their respective pivots in a plane coincident with the axis of said spray, a damping tank positioned within said housing containing a damping fluid through which the outer end of said pendulums drag, the envelope spray portion impinging against and arcuately deflecting said envelope pendulum while the core spray portion passes through the orifice in said envelope pendulum to impinge against and arcuately deflect said core pendulum and a pair of graduated scales positioned upon one face of said tank in registry with the outer ends of said pendulums to separately indicate the amount of arcuate deflection of each pendulum.

HARVEY W. HANNERS.

REFERENCES CITED

The following references are of record in the file of this patent:

UNITED STATES PATENTS

| Number | Name | Date |
|---|---|---|
| 1,288,363 | Young | Dec. 17, 1918 |
| 2,294,511 | Neiman | Sept. 1, 1942 |
| 2,314,991 | Knanth | Mar. 30, 1943 |